Figure 1:
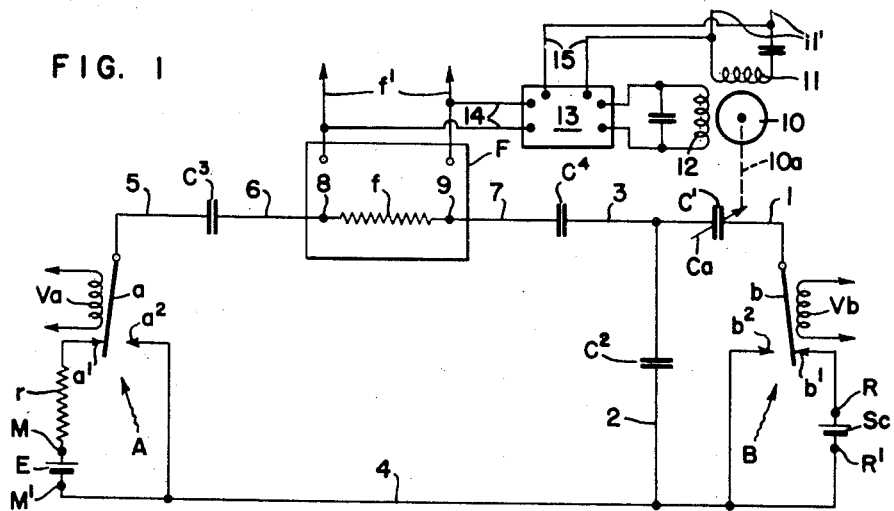

Nov. 18, 1952   L. STANTON   2,618,674
DIFFERENCE MEASURING APPARATUS
Filed Feb. 18, 1950

INVENTOR.
LEONARD STANTON
BY
Arthur H. Swanson
ATTORNEY.

UNITED STATES PATENT OFFICE 2,618,674

DIFFERENCE MEASURING APPARATUS

Leonard Stanton, Philadelphia, Pa., assignor to Minneapolis-Honeywell Regulator Company, Minneapolis, Minn., a corporation of Delaware Application February 18, 1950, Serial No. 145,043

9 Claims. (Cl. 171—95)

The present invention relates generally to apparatus of the capacity-rebalancing type, adapted for use in measuring the voltage developed by ion chambers, pH electrodes, thermocouples, and other small unidirectional voltage sources exhibiting either high or low internal resistance. More specifically, the present invention relates to apparatus wherein the unknown, variable unidirectional voltage to be measured is converted into an alternating voltage signal which is compared with a variable alternating voltage reference signal obtained from an adjustable capacitive voltage divider intermittently energized from a reference source of substantially constant unidirectional voltage. When the compared unknown voltage signal and reference voltage signal are unequal, a detector responds to the resulting voltage signal, and associated rebalancing apparatus is then rendered operative to adjust the capacitive voltage divider as necessary to produce equality between the unknown and reference signals, whereby the apparatus is normally maintained in a balanced condition in which the position or adjustment value of the adjustable element of the capacitive voltage divider corresponds at any time to the then-existing value of the unknown unidirectional voltage.

In the capacity-rebalancing type apparatus known in the prior art, the source of voltage to be measured is intermittently connected to, and hence charges, a first condenser, which ordinarily is a fixed condenser. A second condenser, which is ordinarily a variable condenser and serves as a comparison or reference element, is intermittently connected to, and hence is charged by, a source of constant reference voltage. Ordinarily, the latter is a standard cell. Each charge put on the first condenser by the voltage to be measured is compared with the charge put on the second condenser by the constant voltage source. When these compared condenser charges are unequal, an out-of-balance signal is produced, and the latter is customarily used to control the operation of a motor which in turn adjusts the variable comparison condenser as necessary to equalize the charges on the two condensers.

Due to the fact that the unknown voltage to be measured is employed to charge the fixed condenser in the prior art apparatus just described, the source of the unknown voltage is, in normal operation of the apparatus, caused to supply current to effect this condenser charging action, even when the apparatus is in a balanced condition. Thus, the source of unknown voltage is normally subjected to a current drain which may prove undesirable in many cases.

In accordance with the present invention, however, the voltage to be measured is not used to charge a condenser, but instead is converted into alternating form and is compared with an alternating voltage reference signal. Accordingly, since in the present invention the source of unknown voltage is not required to charge any condensers, current drain from this source is substantially absent when the apparatus is in the balanced condition.

The general object of the present invention is, therefore, to provide an improved capacity-rebalancing apparatus in which the current drain from the unidirectional source of voltage under measurement is for all practical purposes eliminated when the apparatus is in a balanced condition. To this end, I first convert the unknown voltage to be measured into a corresponding alternating voltage, and then compare the magnitude of this voltage with the magnitude of a variable alternating reference voltage obtained from an adjustable capacitive voltage divider. Since my apparatus involves the comparison of voltages, rather than condenser charges, a zero current drain from the source of unknown voltage is realized when the apparatus is in a balanced condition.

A more specific object of the present invention is to provide a novel capacity-rebalancing apparatus comprising connections to a source of unknown voltage the magnitude of which is to be measured, a source of standard, substantially constant voltage, an adjustable capacitive voltage divider for permitting a selected portion of the standard or reference voltage to be compared with the unknown voltage, switching means for converting the unknown and variable reference voltages into corresponding alternating voltage form, and detector means responsive to any difference between the unknown alternating voltage and the alternating reference voltage. The detector may merely indicate the presence of such a voltage difference, thereby to permit the adjustment of the adjustable voltage divider as necessary to maintain said difference equal to zero and said apparatus in a balanced condition. If desired, the detector may include means operative to adjust a variable capacitive element of the voltage divider automatically in order to maintain the apparatus in balance. In either case, the position or adjustment value of the voltage divider corresponding to a difference voltage of zero as applied to the detector is a measure of the magnitude of the unidirectional voltage under measurement, and no significant current is drawn from the source of unknown voltage when the apparatus is in a balanced condition.

In the operation of apparatus according to the present invention, the source of unidirectional voltage to be measured is alternately connected in, and disconnected from, a series circuit including a condenser forming a part of an adjustable capacitive voltage divider and across which there appears an alternating reference voltage of a magnitude dependent upon the adjustment of the voltage divider. Said series circuit also includes the input portion of a voltage responsive detector, whereby this detector is made responsive to any differences between the alternating unknown voltage and the alternating reference voltage produced across said condenser. By means of the detector, the variable capacitive element in the voltage divider is adjusted as necessary to maintain the magnitudes of the unknown voltage and reference voltage equal in the aforementioned series circuit, whereby zero voltage or potential difference is normally maintained across the detector input and the adjustment value of position of the variable capacitive element in the voltage divider provides a measure of the unknown voltage.

In order to provide the variable alternating reference voltage across the first mentioned condenser, the capacitive voltage divider of which this condenser forms a part is alternately connected across a source of reference voltage, and substantially short-circuited. By this means, there is provided the aforementioned alternating reference voltage, which can be varied by adjustment of the voltage divider as necessary to maintain the apparatus in a balanced condition.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described a preferred embodiment of the invention.

Figure 2:
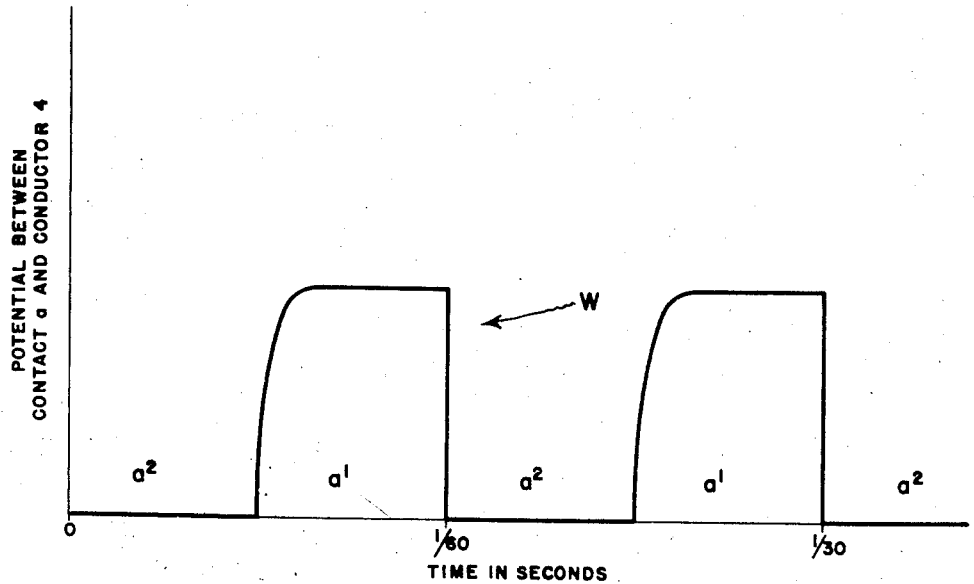

Of the drawings:

Fig. 1 is a circuit diagram illustrating a preferred embodiment of the present invention; and Fig. 2 is a wave form diagram of a voltage produced by the apparatus of Fig. 1.

The form of the invention illustrated in Fig. 1 of the drawings includes a pair of measuring terminals M and M' which are shown as being connected to the respective positive and negative terminals of a source of unknown, variable unidirectional voltage E to be measured. The disclosed arrangement also includes a pair of reference terminals R and R' shown as being connected to the respective positive and negative terminals of a source of substantially constant or standard voltage Sc. In practice, the source Sc may well consist of a standard cell of the type well known in the measuring art.

An adjustable capacitive voltage divider is included in the Fig. 1 apparatus for providing a variable reference voltage from the standard cell Sc. This voltage divider comprises a variable condenser C' and a fixed condenser $C^2$ connected in series between an input or energizing conductor or terminal 1 and a common terminal or conductor 2. The input of the voltage divider is applied between the conductors 1 and 2, while the variable output of the divider is obtained between the conductor 2 and an output terminal or conductor 3 which is connected to the junction between the condensers C' and $C^2$. When the voltage divider is energized by the application of a voltage between the conductors 1 and 2, an output voltage is obtained between the conductors 2 and 3 which is variable in accordance with the adjustment of the variable condenser C'.

The apparatus of Fig. 1 also includes a switch mechanism having a portion A associated with the unknown voltage source E, and having a portion B associated with the standard cell Sc. The switch portion A includes a movable contact $a$ which is operative, by reason of the driving force supplied by an operating coil Va, alternately to engage each of relatively stationary contacts $a'$ and $a^2$. Similarly, the switch portion B includes a movable contact $b$ which is operative under the influence of an operating coil Vb alternately to engage each of relatively stationary contacts $b'$ and $b^2$. When the operating coils Va and Vb are energized from a source of alternating current, the movable contacts $a$ and $b$, which are magnetically polarized by means not shown, are caused to vibrate back and forth between their respective associated stationary contacts $a'$—$a^2$ and $b'$—$b^2$ in synchronism and at the frequency of the alternating current supplied to the coils Va and Vb. The switching action thus provided by the switch mechanisms A and B hence occurs at the frequency of the supplied alternating current, and, for the purposes of the present invention, the movable contacts $a$ and $b$ are so synchronized that the contact $a$ engages the contact $a'$ during periods in which the contact $b$ engages the contact $b'$, these periods alternating with others in which the contact $a$ engages the contact $a^2$ as the contact $b$ simultaneously engages the contact $b^2$.

The measuring terminal M, which is connected to the positive terminal of the voltage source E, is connected through a resistor $r$ to the switch contact $a'$. The resistor $r$ is intended to include both the internal resistance of the source E and any other resistance present in the circuit including the source E. The other measuring terminal M', which is connected to the negative terminal of the source E, is connected to a common conductor 4 to which is connected the switch contact $a^2$. The movable contact $a$ is connected to a conductor 5 which is connected through a blocking or isolating condenser $C^3$ to a conductor 6.

From the above description it will be apparent that when the switch mechanism A is in operation, the alternate motion of the movable contact $a$ between the contacts $a'$ and $a^2$, and hence between the positive and negative terminals of the voltage source E, causes the production of an alternating voltage signal between the conductors 4 and 6. This voltage signal is representative of the unknown voltage to be measured, and is of a magnitude corresponding to the magnitude of the unknown voltage.

There is illustrated in Fig. 2 a typical wave form diagram of the voltage W obtained between the movable contact $a$, or the conductor 5, and the conductor 4 when operating coil Va is energized with alternating current having a frequency of 60 cycles per second as will be hereinafter described. From Fig. 2 it will be evident that during the period in which the contact $a$ engages the contact $a^2$, the magnitude of the voltage W will be zero, since the conductors 4 and 5 are then substantially short-circuited. This condition is shown by the portions $a^2$ of the curve of Fig. 2. When the contact $a$ moves from engagement with the contact $a^2$ and into engagement with the contact $a'$, the voltage W instantly begins to rise, but does not reach its maximum value instantaneously because of the presence of stray capacitances associated with the contact $a$. These capacitances combine in practice with the resistor $r$ to introduce a slight time constant effect into the operation of the apparatus. As shown in Fig. 2, however, this time constant is relatively small, so that the voltage W reaches its maximum value shortly after the start of the period $a'$ during which the contact $a$ engages the contact $a'$. At the end of this period, the voltage W instantly drops to zero as the contact $a$ engages the contact $a^2$ and the cycle just described is repeated.

It can readily be seen from Fig. 2 that the operation of the switch mechanism A converts the unknown unidirectional voltage from the source E into a corresponding substantially square wave form pulsating unidirectional voltage between the conductors 4 and 5. The alternating component of this voltage, which appears between the conductors 4 and 6, is ideally suited for comparison with the alternating reference voltage obtained from the standard cell Sc in a manner to be described.

The reference terminal R, which is connected to the positive terminal of the standard cell Sc, is connected to the stationary switch contact $b'$, while the reference terminal R', which is connected to the negative standard cell terminal, is connected to the common conductor 4 and the switch contact $b^2$. The energizing conductor 1 of the adjustable capacitive voltage divider is connected to the movable switch contact $b$, and the common conductor 2 of the voltage divider is connected to the aforementioned conductor 4. The voltage divider output conductor 3 is connected through a blocking or isolating condenser $C^4$ to a conductor 7.

The blocking or isolating condensers $C^3$ and $C^4$ serve to isolate the respective conductors 5 and 3 from any possible connection with the conductor 4 through the detecting apparatus shortly to be described. In addition, the condenser $C^3$ prevents the D. C. voltage component, which is present between the conductors 4 and 5, from appearing between conductors 4 and 6. Further, the condenser $C^4$ also serves to prevent discharge of the condenser $C^2$ through the detecting means, to be described, in the event that this means exhibits a leakage path to the conductor 4.

When the switch mechanism B is in operation, the voltage divider energizing conductors 1 and 2 are alternately connected across the standard cell Sc, and substantially short-circuited. Specifically, when the movable switch contact $b$ engages the contact $b'$, the positive reference terminal R is connected to the voltage divider energizing conductor 1, while the negative reference terminal R' is connected to the energizing conductor 2. Under this condition, the voltage dividing condensers C and $C^2$ are connected in series between the positive and negative terminals of the standard cell Sc. When the movable switch contact $b$ engages the contact $b^2$, however, the voltage divider conductors 1 and 2 are substantially short-circuited. Accordingly, operation of the switch mechanism B causes the production between the conductors 4 and 7 of a variable alternating voltage reference signal having a magnitude dependent upon the adjustment or adjustment value of the variable condenser $C'$.

Also included in the Fig. 1 apparatus is a voltage-responsive detector F having an input portion or circuit including a pair of input terminals 8 and 9. The detector input circuit also includes a resistor $f$, which is intended to illustrate the internal input resistance of the detector F. In practice, the value of the resistor $f$ should at least be equal to the value of the resistor $r$ in the unknown voltage circuit. However, it will be found advantageous to make the resistance of the resistor $f$ as many times greater than the resistance of the resistor $r$ as is practically possible. By so doing, the operation of the apparatus will be correspondingly improved.

The conductor 6, associated with the unknown voltage source E, is connected to the detector input terminal 8, while the conductor 7, associated with the capacitive voltage divider and the standard cell Sc, is connected to the detector input terminal 9. As was previously mentioned, the motions of the movable switch contacts $a$ and $b$ are synchronized so that the contact $a$ alternately engages the contacts $a'$ and $a^2$ as the contact $b$ respectively engages the contacts $b'$ and $b^2$. With the other circuit connections as shown and described, this means that the unknown alternating voltage between the conductors 4 and 6 makes the detector input terminal 8 positive with respect to the common conductor 4 during the intervals in which the reference alternating voltage between the conductors 4 and 7 makes the detector input terminal 9 positive with respect to the conductor 4. From this it can readily be seen that when the unknown alternating voltage is equal in magnitude to the alternating reference voltage, the detector input terminals 8 and 9 will each have the same potential relative to the conductor 4, and hence will have zero potential difference between them. This condition represents the balanced condition of the apparatus.

Looking at the above-described arrangement in a slightly different manner, it can be seen that the measuring terminals M and M' and the output portion of the capacitive voltage divider, including the condenser $C^2$ between the conductors 2 or 4 and 3, are connected in series voltage opposition across the input circuit of the detector F during periods which alternate with others in which the input to the voltage divider, between the conductors 1 and 2, is effectively short-circuited, and in which solely said voltage divider output portion is connected across the detector input circuit. Again it is obvious that when the unknown and reference alternating voltages are equal, no resultant voltage will appear across the detector input circuit between the terminals 8 and 9.

The voltage-responsive detector F is provided with a pair of output conductors $f'$ between which an output signal is adapted to be produced by the detector F when a resultant voltage appears between the input terminals 8 and 9. The output conductors $f'$ may well be connected to an external indicating device (not shown) to indicate the achievement of zero input voltage to the detector F, or the detector itself may include such an indicating device. In either case, the detector provides the necessary indication to permit the adjustment of the variable condenser $C'$, and hence the adjustment of the alternating reference voltage between the conductors 4 and 7, as necessary to secure a zero resultant voltage between the detector input terminals 8 and 9.

If desired, the detector output conductors f' may be connected to motor-controlling means which are operative to control the operation of a suitable motor 10 mechanically arranged to adjust the value of the condenser C'. As diagrammatically shown in Fig. 1, the motor 10 is a reversible alternating current motor having a power winding 11 with its terminals connected to a source of alternating current which may well have a frequency of 60 cycles per second. Motor 10 has a control winding 12 connected across the output terminals of an amplifier 13 having its input terminals 14 connected across the output terminals f' of the detector F. As shown, the amplifier 13 has energizing terminals 15 connected to the source of alternating current by which the winding 11 is energized. When the motor 10 rotates, it operates through a transmitting element 10a to turn a condenser adjusting element Ca and thereby increases or decreases the capacity of the variable condenser C', depending upon the direction of rotation of the motor 10. The direction of rotation of the motor 10 depends upon whether the current flowing in the winding 12 leads or lags the current flowing in the winding 11. The phase of the current flowing through the winding 12 is shifted 180° by a reversal in the relative polarities of the detector output terminals f' of the detector F. The motor and motor control means shown diagrammatically in Fig. 1 is of the well-known automatic self-balancing type disclosed and claimed in the Wills Patent 2,423,540, July 8, 1947, and therefore requires no further illustration or description herein.

When such means are employed, the appearance of an input voltage between the detector input terminals 8 and 9 will cause the said motor to adjust the variable condenser C' as necessary to make the alternating reference voltage equal to the unknown alternating voltage, thereby to return the apparatus to a balanced condition and to maintain this condition automatically.

In the operation of the apparatus of the present invention as herein described, the switch mechanism operating coils Va and Vb may well be energized with alternating current having a frequency of 60 cycles per second. When this is done, the polarization of the movable switch contacts a and b will cause each of the alternate switch positions to have a duration of substantially 1/120 of a second. Accordingly, the frequency of the alternating unknown and variable reference voltages will be 60 cycles per second, as shown in Fig. 2.

With the switch mechanism portions A and B operating as just described, the unknown alternating voltage and the variable alternating reference voltage will be applied in opposition to the input circuit of the voltage responsive detector F. When these two voltages are equal in magnitude, no resultant input voltage will appear between the terminals 8 and 9, no adjustment of the variable condenser C' will be required, and the apparatus will be in a balanced condition. The adjustment value or position of the condenser C' will then be a measure of the magnitude of the unknown alternating voltage, and hence of the magnitude of the unknown unidirectional voltage from the source E.

Upon a change in the value of the unknown voltage being measured, a corresponding change in the unknown alternating voltage between the conductors 4 and 6 will be produced, whereby a resultant voltage will appear between the detector input terminals 8 and 9. The detector F will then detect this resultant input voltage, and will provide either an indication of a need for readjustment of the variable condenser C', or an action which will automatically readjust the condenser C'. In either case, the condenser C' will be adjusted as necessary to cause the magnitude of the variable alternating reference voltage between the conductors 4 and 7 to be just equal to the new value of the unknown alternating voltage, whereby the detector input voltage will once again have zero value. Thus, the apparatus will be returned to the balanced condition, with the variable condenser C' exhibiting or occupying a new adjustment value or position corresponding to the new value of the unknown unidirectional voltage of the source E.

When the apparatus is in the balanced condition as just described, substantially no current will be drawn from the voltage source E, since the latter is not used either to charge a condenser or to cause opposing detector currents to flow at balance. It can readily be seen that, at balance, the voltage source E is merely required to maintain the detector input terminal 8 at the same potential relative to the conductor 4 that the standard cell Sc and capacitive voltage divider maintain the detector input terminal 9 relative to the conductor 4. Aside from minute leakage current, which can be properly disregarded in practice, the operation just described requires no current to be drawn from the voltage source E when the apparatus is balanced.

From the above it should be obvious that the apparatus of the present invention is extremely well suited for use with unknown voltage sources from which current drains at balance are objectionable or even intolerable. Such sources include those wherein the internal resistance, represented by the resistor r, are relatively high. Thus, an unknown voltage source E having an internal resistance of the order of 100 or 200 megohms will function in an entirely satisfactory manner in cooperation with the apparatus of the present invention.

By way of illustration, and not by way of limitation, it is noted that when the source E exhibits an internal resistance of from 100 to 200 megohms and provides an unknown unidirectional voltage having a magnitude of from 5 to 50 millivolts, the values of others of the components of the apparatus of Fig. 1 may well be as follows:

$C'$—20–200 micromicrofarads
$C^2$—0.04 microfarad
$C^3$—0.05 microfarad
$C^4$—0.05 microfarad
$f$—100 to 1,000 megohms
Sc—1 volt (approximately)

While, in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent, is:

1. Measuring apparatus comprising a circuit network including a source of substantially constant voltage and first and second measuring terminals adapted for connection to the respective terminals of opposite polarity of a source of variable unidirectional voltage to be measured, said source of constant voltage having first and second reference terminals of opposite polarity, an adjustable capacitive voltage divider having an input portion and an output portion, first switch means operative to connect said first and second reference terminals across said input portion during periods which alternate with others in which said input portion is effectively short-circuited, whereby there is produced across said output portion an alternating voltage signal having a magnitude dependent upon the adjustment of said voltage divider, a measuring circuit portion, second switch means operative to connect said first and second measuring terminals across said measuring portion during periods which alternate with others in which said measuring portion is effectively short-circuited, whereby there is produced across said measuring portion an alternating voltage signal having a magnitude dependent upon the value of variable unidirectional voltage to be measured, means for simultaneously operating said first and second switch means, a detector having an input circuit and responsive to the magnitude of voltages applied thereacross, and conductor means connecting said measuring portion and said output portion in series voltage opposition across said detector input circuit.

2. Measuring apparatus comprising a circuit network including a source of substantially constant voltage and first and second measuring terminals adapted for connection to the respective terminals of opposite polarity of a source of variable unidirectional voltage to be measured, said source of constant voltage having first and second reference terminals of opposite polarity, an adjustable capacitive voltage divider comprising a variable condenser, a fixed condenser, an input portion including both of said condensers connected in series, and an output portion including only one of said condensers, a detector having an input circuit and responsive to the magnitude of the voltage applied thereacross, and switch means operative to connect said reference terminals across the input portion of said voltage divider and simultaneously to connect said measuring terminals and the output portion of said voltage divider in series voltage opposition across said detector input circuit during periods which alternate with others in which said switch means is operative effectively to short-circuit said voltage divider input portion and simultaneously to connect solely said voltage divider output portion across said detector input circuit.

3. Measuring apparatus comprising a circuit network including a source of substantially constant voltage and first and second measuring terminals adapted for connection to the respective terminals of opposite polarity of a source of variable unidirectional voltage to be measured, said source of constant voltage having first and second reference terminals of opposite polarity, said first measuring terminal and said first reference terminal being of the same polarity, an adjustable capacitive voltage divider having an input portion, an output portion, an energizing terminal connected to said input portion, an output terminal connected to said output portion, and a terminal common to both said input and output portions, a common conductor connecting together said first measuring and reference terminals and the common terminal of said voltage divider, a voltage responsive detector having an input circuit including first and second input terminals, a switch mechanism including a first switching portion operative alternately to connect said first and second measuring terminals to the first input terminal of said detector, a conductor connecting together the second input terminal of said detector and the output terminal of said voltage divider, and a second switching portion of said switch mechanism operative to connect said second reference terminal to the energizing terminal of said voltage divider during the periods in which said first switching portion connects said second measuring terminal to the first input terminal of said detector, and operative to connect said energizing terminal to said first reference terminal during the periods which alternate with the first mentioned periods and in which said first switching portion connects said first measuring terminal to the first input terminal of said detector.

4. Apparatus as specified in claim 3, including a first isolating condenser connected in series between the first input terminal of said detector and said first and second measuring terminals in alternation, and a second isolating condenser connected in series between the second input terminal of said detector and the output terminal of said voltage divider.

5. Apparatus as specified in claim 3, wherein said first switching portion connects each of said first and second measuring terminals alternately to the first input terminal of said detector approximately sixty times per second, and wherein the duration of each of said periods is approximately one one-hundred-and-twentieth of a second.

6. Apparatus as specified in claim 3, wherein said adjustable capacitive voltage divider includes a variable condenser and a fixed condenser connected in series in said input portion between said energizing terminal and said common terminal, and includes a connection between said output terminal and the junction between said condensers, whereby only one of said condensers is included in said output portion between said output terminal and said common terminal.

7. Apparatus as specified in claim 6, wherein said detector includes adjusting means physically coupled to said variable condenser and operative when energized to vary the capacity of the latter, and includes energizing means responsive to a voltage between said input terminals and operative to energize said adjusting means for operation thereof as necessary to reduce the last mentioned voltage to zero by adjustment of said variable condenser.

8. Apparatus as specified in claim 3, wherein each of said first and second switching portions includes first and second relatively stationary contacts and a cooperating relatively movable contact, a connection between the first stationary contact of said first switching portion and said first measuring terminal, a connection between the second stationary contact of said first switching portion and said second measuring terminal, a connection between the movable contact of said first switching portion and said first input terminal, a connection between the first stationary contact of said second switching portion and said first reference terminal, a connection between the second stationary contact of said second switching portion and said second reference terminal, and a connection between the movable contact of said second switching portion and said energizing terminal, and wherein said switch mechanism also includes operating means operative when energized to move each of said movable contacts into electrical engagement with the respective one of said first stationary contacts during the second mentioned periods, and to move each of said movable contacts into electrical engagement with the respective one of said second stationary contacts during said first mentioned periods.

9. Apparatus as specified in claim 3, wherein the external resistance between said measuring terminals when connected to the source of voltage to be measured is of the order of one-hundred megohms, and wherein the internal input resistance of said detector between said input terminals is at least equal to said external resistance.

LEONARD STANTON.

No references cited.